United States Patent
Kawakami

(10) Patent No.: US 12,052,490 B2
(45) Date of Patent: Jul. 30, 2024

(54) IMAGE PICKUP APPARATUS THAT AUTOMATICALLY DETECTS FOR AND SHOOTS SUBJECT, CONTROL METHOD THEREFOR, AND STORAGE MEDIUM

(71) Applicant: CANON KABUSHIKI KAISHA, Tokyo (JP)

(72) Inventor: Takashi Kawakami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 128 days.

(21) Appl. No.: 17/972,696

(22) Filed: Oct. 25, 2022

(65) Prior Publication Data

US 2023/0128558 A1    Apr. 27, 2023

(30) Foreign Application Priority Data

Oct. 26, 2021 (JP) .................................. 2021-174915

(51) Int. Cl.
  *H04N 23/61* (2023.01)
  *H04N 23/66* (2023.01)
  *H04N 23/695* (2023.01)

(52) U.S. Cl.
  CPC ............. *H04N 23/61* (2023.01); *H04N 23/66* (2023.01); *H04N 23/695* (2023.01)

(58) Field of Classification Search
  CPC ...... H04N 23/61; H04N 23/66; H04N 23/695; H04N 23/65; H04N 23/6812; H04N 23/687; H04N 23/69
  See application file for complete search history.

(56) References Cited

U.S. PATENT DOCUMENTS

| | | | |
|---|---|---|---|
| 8,045,013 B2 * | 10/2011 | Abe | H04N 23/611 348/222.1 |
| 9,852,394 B1 * | 12/2017 | Rouaix | B65G 1/1373 |
| 9,973,737 B1 * | 5/2018 | Wilkins | G06T 7/20 |
| 10,225,462 B2 * | 3/2019 | Murakami | H04N 23/635 |
| 10,372,750 B2 * | 8/2019 | Matsuda | G06V 40/172 |
| 10,446,941 B1 * | 10/2019 | Kalam | H01Q 21/28 |
| 10,827,123 B1 * | 11/2020 | Flanigan | B64D 47/08 |
| 11,786,206 B2 * | 10/2023 | Steines | G06F 3/012 378/91 |
| 2003/0197612 A1 * | 10/2003 | Tanaka | G08B 13/2462 340/8.1 |

(Continued)

FOREIGN PATENT DOCUMENTS

| | | |
|---|---|---|
| JP | 2008-288745 A | 11/2008 |
| JP | 2021-036629 A | 3/2021 |

*Primary Examiner* — Chiawei Chen
(74) *Attorney, Agent, or Firm* — Venable LLP

(57) ABSTRACT

An image pickup apparatus which is capable of reliably detecting a subject using a wireless tag and shooting the subject with a desirable composition and facial expression. The image pickup apparatus has an image pickup unit, a changing unit that changes an orientation of an optical axis of the image pickup unit, a receiving unit that receives a radio wave transmitted from an external wireless tag to detect a position of the wireless tag, and a subject detecting unit that detects a subject from image data output from the image pickup unit. When the subject is detected, whether or not to perform shooting is determined based on the image data. When the optical axis of the image pickup unit faces toward the wireless tag, a threshold value for detecting the subject is set to a smaller value than an initial value thereof.

14 Claims, 10 Drawing Sheets

(56) References Cited

U.S. PATENT DOCUMENTS

| | | | |
|---|---|---|---|
| 2007/0097211 A1* | 5/2007 | Washington | G08B 13/2462 340/572.1 |
| 2008/0002031 A1* | 1/2008 | Cana | H04N 23/635 340/572.1 |
| 2012/0269386 A1* | 10/2012 | Hankins | G06V 20/52 382/103 |
| 2015/0002808 A1* | 1/2015 | Rizzo, III | A61N 1/36046 351/158 |
| 2015/0109457 A1* | 4/2015 | Stout | H04N 5/222 348/169 |
| 2016/0116593 A1* | 4/2016 | Kim | G01S 17/931 356/5.01 |
| 2017/0019590 A1* | 1/2017 | Nakamura | G06V 40/161 |
| 2017/0200032 A1* | 7/2017 | Sample | G06K 7/10366 |
| 2019/0050694 A1* | 2/2019 | Fukagai | G06V 20/10 |
| 2019/0313020 A1* | 10/2019 | Snyder | H04N 23/69 |

\* cited by examiner

FIG. 1
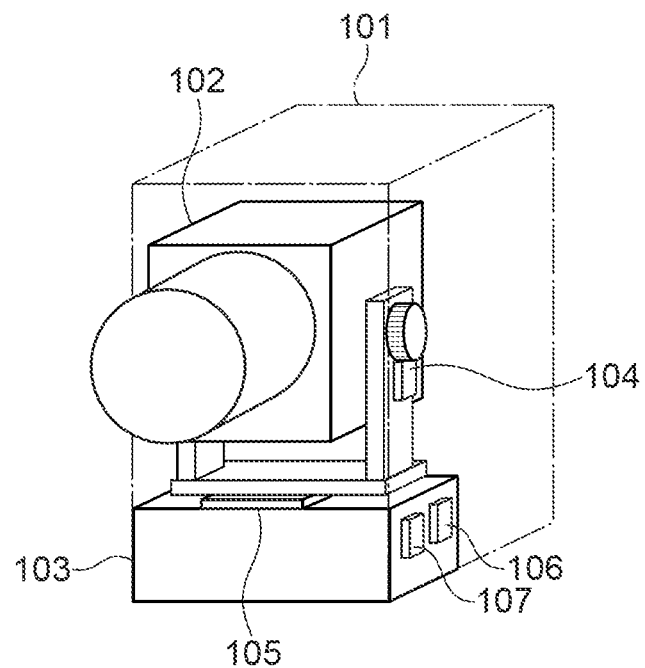
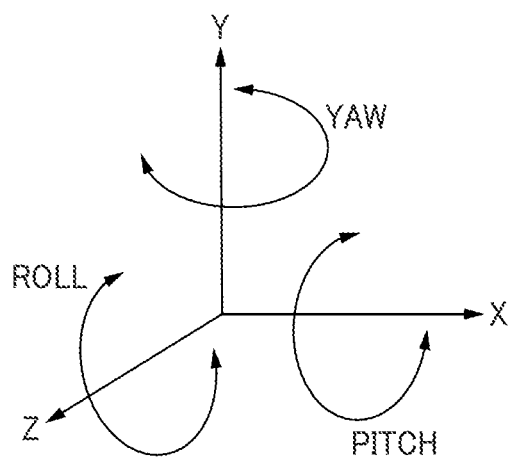

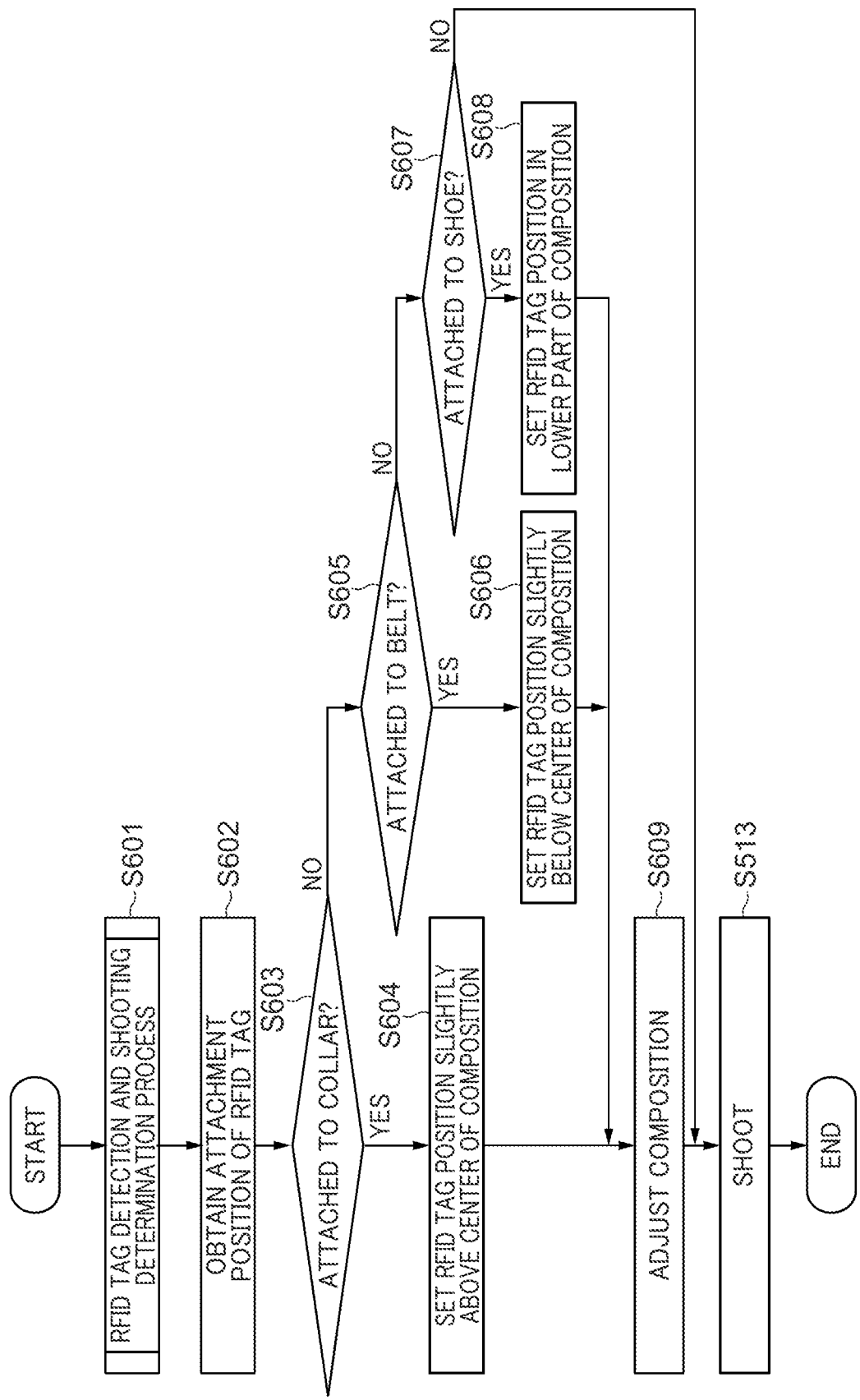

IMAGE PICKUP APPARATUS THAT AUTOMATICALLY DETECTS FOR AND SHOOTS SUBJECT, CONTROL METHOD THEREFOR, AND STORAGE MEDIUM

BACKGROUND OF THE INVENTION

Field of the Invention

The present invention relates to an image pickup apparatus that automatically detects for and shoots a subject, a control method for the image pickup apparatus, and a storage medium.

Description of the Related Art

In recent years, an automatic shooting camera that automatically takes pictures without a user performing a shooting operation has been put into practical use.

Examples of the automatic shooting camera include a lifelogging camera that automatically and repeatedly takes pictures at regular intervals, and an automatic shooting camera that properly controls pan, tilt, and zoom to automatically recognize and shoot a subject in a surrounding area.

In general, to recognize a subject with an automatic shooting camera, the face of a person is detected, and detection information such as the size, position, etc. of the face is used.

However, when a scene in which a child is playing with a toy is to be shot, there may be cases where the face of the child cannot be detected because the child is absorbed in the toy and does not raise his/her face, and as a result, the right timing of automatic shooting is missed.

As another method for detecting a subject, there is a method in which the orientation of a wireless tag such as an RFID (Radio Frequency Identifier) which a subject is holding is detected.

As a technique for detecting and shooting a subject using a wireless tag, a method in which the orientation of a wireless tag held by a subject is detected, and a camera is held in a state of facing toward the subject is maintained is disclosed in Japanese Laid-Open Patent Publication (Kokai) No. 2021-036629.

Japanese Laid-Open Patent Publication (Kokai) No. 2008-288745 discloses a method in which a camera is turned toward a wireless tag held by a subject, and shooting is performed when the subject is detected.

However, a subject fitting in a field of view will not suffice to take a picture by automatic shooting.

For example, to take a picture for commemoration or recording, compositions such as the position and size of a subject, facial expression of a subject, and so forth are important. To take a plurality of such pictures, it is necessary to shoot variations thereof.

Japanese Laid-Open Patent Publication (Kokai) No. 2021-036629 and Japanese Laid-Open Patent Publication (Kokai) No. 2008-288745 focus on video shooting, and neither of them mentions how to properly control compositions and facial expressions when taking pictures.

SUMMARY OF THE INVENTION

The present invention provides an image pickup apparatus which is capable of reliably detecting a subject using a wireless tag and shooting a subject with a desirable composition and facial expression, a control method for the image pickup apparatus, and a storage medium.

Accordingly, the present invention provides an image pickup apparatus comprising an image pickup unit, a changing unit that changes an orientation of an optical axis of the image pickup unit, a receiving unit that receives a radio wave transmitted from an external wireless tag to detect a position of the wireless tag, a subject detecting unit that detects a subject from image data output from the image pickup unit, at least one processor, and a memory coupled to the at least one processor, the memory having instructions that, when executed by the processor, perform operations as a shooting determination unit that, based on the image data, determines whether or not to perform shooting using the image pickup unit when the subject is detected, and a setting unit that, when the optical axis of the image pickup unit faces toward the wireless tag, sets a threshold value for detecting the subject using the subject detecting unit to a smaller value than an initial value thereof.

Further features of the present invention will become apparent from the following description of exemplary embodiments with reference to the attached drawings.

BRIEF DESCRIPTION OF THE DRAWINGS

FIG. 1 is a view schematically showing an image pickup apparatus according to an embodiment 1.

FIG. 6 is a flowchart of an automatic shooting process according to an embodiment 2.

DESCRIPTION OF THE EMBODIMENTS

Figure 2:
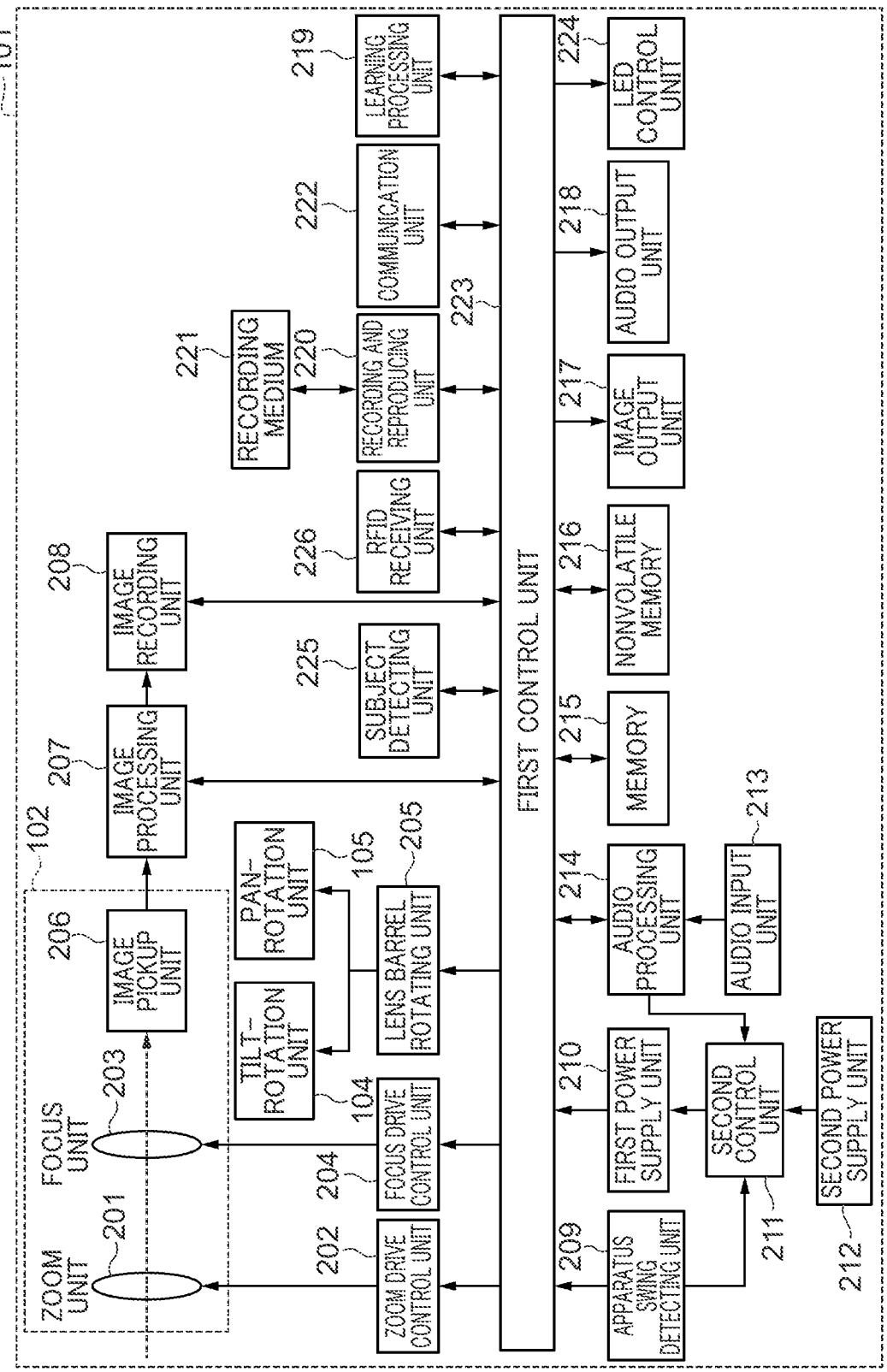
FIG. 2 is a block diagram showing an arrangement of the image pickup apparatus.

The present invention will now be described in detail below with reference to the accompanying drawings showing embodiments thereof.

It should be noted that the embodiments described below are examples of means for embodying the present invention, and modifications and alterations can be made as appropriate depending on the arrangement of an apparatus, to which the present invention is applied, and various conditions.

Moreover, the embodiments may be combined together as appropriate.

Embodiment 1

<Arrangement of Image Pickup Apparatus>

FIG. 1 is a view schematically showing an image pickup apparatus 101 according to an embodiment 1.

Referring to FIG. 1, the image pickup apparatus 101 is a digital camera integral with a fixed unit 103, which holds a lens barrel 102 such that the lens barrel 102 is rotatable. The image pickup apparatus 101 is equipped with an operating member, not shown (which will hereafter be referred to as a power button but may be an operating member that enables tapping, flicking, and swiping on a touchscreen), which is capable of operating a power switch, and others.

The lens barrel 102 is a case including a taking lens group and an image pickup device that take images, and sends and receives signals to and from the image pickup apparatus 101.

The fixed unit 103 has a tilt-rotation unit 104 and a pan-rotation unit 105 that are capable of rotating the lens barrel 102 with respect to the fixed unit 103, an angular velocity sensor 106, and an acceleration sensor 107.

The tilt-rotation unit 104 (rotation unit) is a motor drive mechanism that is capable of rotating the lens barrel 102 with respect to the fixed unit 103 in a pitch direction shown in FIG. 1.

The pan-rotation unit 105 (rotation unit) is a motor drive mechanism that is capable of rotating the lens barrel 102 with respect to the fixed unit 104 in a yaw direction shown in FIG. 1.

It should be noted that changing means other than the tilt-rotation unit 104 and the pan-rotation unit 105 may be used as long as it is capable of changing the orientation of an optical axis of the image pickup device in the lens barrel 102. Specifically, although in the embodiment 1, the lens barrel 102 is rotatable in the directions of the two axes i.e., the pitch direction and the yaw direction with respect to the fixed unit 103, this is not limitative as long as the lens barrel 102 is rotatable in the direction of one or more axes with respect to the fixed unit 103. For example, the fixed unit 103 may hold the lens barrel 102 such that the lens barrel 102 can be rotated in a roll direction shown in FIG. 1.

The angular velocity sensor 106 is a gyro sensor that detects angular speeds of the image pickup apparatus 101 in the directions of the three axes.

The acceleration sensor 107 is an acceleration sensor that detects accelerations of the image pickup apparatus 101 in the directions of the three axes.

Both the angular velocity sensor 106 and the acceleration sensor 107 are mounted on an apparatus shake detecting unit 209 (FIG. 2), which will be described later, detecting a shake angle of the image pickup apparatus 101. The image pickup apparatus 101 controls to rotates the lens barrel 102 using the tilt-rotation unit 104 and the pan-rotation unit 105 based on the shake angle detected by the angular velocity sensor 106 and the acceleration sensor 107. As a result, shake of the lens barrel 102, which is a movable unit, is corrected for, and also tilt thereof is corrected for.

FIG. 2 is a block diagram schematically showing an arrangement of the image pickup apparatus 101.

Referring to FIG. 2, the image pickup apparatus 101 has the lens barrel 102, which is removable from the image pickup apparatus 101, a zoom drive control unit 202, a focus drive control unit 204, a lens barrel rotating unit 205, an image processing unit 207, and an image recording unit 208. The image pickup apparatus 101 has the apparatus shake detecting unit 209, a first power supply unit 210, a second control unit 211, a second power supply unit 212, an audio input unit 213, an audio processing unit 214, a memory 215, a nonvolatile memory 216, an image output unit 217, and an audio output unit 218. The image pickup apparatus 101 also has a learning processing unit 219, a recording and reproducing unit 220, a recording medium 221, a communication unit 222, a first control unit 223, an LED control unit 224, a subject detecting unit 225, and an RFID receiving unit 226.

The first control unit 223 is comprised of a processor (for example, a CPU, a GPU, a microprocessor, an MPU) and memory (for example, DRAM). They carry out various types of processes to control blocks of the image pickup apparatus 101 and control transfer of data among the blocks.

The nonvolatile memory 216 is a memory comprised of EEPROM that is electrically erasable and programmable. Constants, programs, and so forth for operation of the first control unit 223 are stored in the nonvolatile memory 216.

As shown in FIG. 2, the lens barrel 102 has an image pickup unit 206, a zoom unit 201 including a zoom lens for zooming of the image pickup unit 206, and a focus unit including a lens that adjusts the focus of the image pickup unit 206. The image pickup unit 206 has the image pickup device, which receives light entering through each lens in the lens barrel 102 and generates information about electric charge according to the quantity of received light as analog image data.

The zoom drive control unit 202 (zoom control unit) controls the operation of the zoom unit 201.

The focus drive control unit 204 controls the operation of the focus unit 203.

The image processing unit 207 performs A/D conversion of analog image data output from the image pickup unit 206 to obtain digital image data and also subjects the digital image data to image processing such as distortion correction, white balance adjustment, and color interpolation processing.

The image recording unit 208 converts digital image data, which has been subjected to image processing and output from the image processing unit 207, into a recording format such as JPEG and sends the resulting data to the memory 215 or the image output unit 217.

The lens barrel rotating unit 205 drives the tilt-rotation unit 104 and the pan-rotation unit 105 described earlier with reference to FIG. 1 to drive the lens barrel 102 in a tilt direction and a pan direction.

The apparatus shake detecting unit 209 is equipped with the angular velocity sensor 106 and the acceleration sensor 107 described earlier with reference to FIG. 1. The apparatus shake detecting unit 209 computes a rotational angle of the image pickup apparatus 101, a shift amount of the image pickup apparatus 101, and so forth based on a signal (shake angle) detected by the angular velocity sensor 106 and the acceleration sensor 107.

The audio input unit 213, which is equipped with a microphone, obtains analog audio data around the image pickup apparatus 101 through the microphone, and performs analog-to-digital conversion of the analog audio data to generate digital audio data.

The audio processing unit 214 performs audio-related processing such as optimization processing on digital audio data output from the audio input unit 213. The first control unit 223 sends digital audio data, which has been subjected to processing by the audio processing unit 214, to the memory 215. Several audio commands are registered in advance in the audio processing unit 214. Upon detecting one of the audio commands, the audio processing unit 214 is configured to output a detection trigger signal to the first control unit 223 or the second control unit 211.

The memory 215 temporarily stores digital image data (hereafter referred to merely as image data) which has been subjected to image processing by the image processing unit 207, and digital audio data (hereafter referred to merely as audio data) which has been subjected to processing by the audio processing unit 214.

The image processing unit 207 and the audio processing unit 214 reads out image data and audio data temporarily stored in the memory 215 and performs encoding of the image data, encoding of the audio data, and so forth to generate compressed image data and compressed audio data. The first control unit 223 sends the compressed image data and the compressed audio data to the recording and reproducing unit 220. It should be noted that the audio processing unit 214 may not encode audio data. In this case, the first control unit 223 sends compressed image data generated by the image processing unit 207 and audio data generated by the audio processing unit 214 to the recording and reproducing unit 220.

The recording and reproducing unit 220 receives, from the first control unit 223, the compressed image data generated by the image processing unit 207, the compressed audio data (or the audio data) generated by the audio processing unit 214, and other control data related to shooting, and so forth to record them in the recording medium 221.

The recording medium 221 may be either a recording medium incorporated in the image pickup apparatus 101 or a removable recording medium. The recording medium 221 is capable of recording various types of data such as the compressed image data, the compressed audio data, and the audio data generated in the image pickup apparatus 101. In general, a medium with larger capacity than that of the nonvolatile memory 216 is used as the recording medium 221. For example, the recording medium 221 may include all types of storage media such as a hard disk, an optical disk, a magneto-optical disk, a CD-R, DVD-R, a magnetic tape, a nonvolatile semiconductor memory, and a flash memory.

The recording and reproducing unit 220 also reads out (reproduces) data, reproduction of which was ordered by the first control unit 223, among the compressed image data, the compressed audio data, the audio data, various types of data, and programs. The first control unit 223 sends the compressed image data or the compressed audio data read out from the recording and reproducing unit 220 to the image processing unit 207 and the audio processing unit 214. The image processing unit 207 and the audio processing unit 214 temporarily stores the compressed image data or the compressed audio data in the memory 215, decodes it through a predetermined procedure, and sends the decoded signal to the image output unit 217 and the audio output unit 218.

The second control unit 211 is provided separately from the first control unit 223, which controls the entire main system of the image pickup apparatus 101, and controls the supply of power to the first control unit 223.

The first power supply unit 210 and the second power supply unit 212 supply power for operating the first control unit 223 and the second control unit 211, respectively. In response to depression of the power button provided in the image pickup apparatus 101, power is supplied to both the first control unit 223 and the second control unit 211 first, and as will be described later, the first control unit 223 is controlled to turn off the supply of power to the first power supply unit 210. Even while the first control unit 223 is not operating, the second control unit 211 is operating, and information from the apparatus shake detecting unit 209 and the audio processing unit 214 is input to the second control unit 211. Based on various types of input information, the second control unit 211 determines whether or not to start the first control unit 223, and upon determining to start the first control unit 223, the second control unit 211 instructs the first power supply unit 210 to supply power to the first control unit 223.

The audio output unit 218 is connected to a speaker (not shown) incorporated in the image pickup apparatus 101, and for example, at the time of shooting, outputs an audio pattern set in advance to the speaker.

The LED control unit 224 is connected to an LED (not shown) provided in the image pickup apparatus 101 and for example, at the time of shooting, controls the LED in a lighting/blinking pattern set in advance.

The image output unit 217, which is comprised of an image output terminal in the embodiment 1, sends image data for displaying an image on a connected external display or the like. It should be noted that the audio output unit 218 and the image output unit 217 may be comprised of one connected terminal such as an HDMI (registered trademark) (High-Definition Multimedia Interface) terminal.

The learning processing unit 219 learns user preferences for subjects, compositions, and so forth. For example, when the user frequently views photos with dogs and photos with subjects' faces close up, the learning processing unit 219 learns that photos with dogs and photos with subjects' close-up faces are user preferences. The learned user preferences are used when shooting or when the user views photos on an external apparatus 301, and photos suited to the user preferences are presented to the user.

The communication unit 222 carries out communications between the image pickup apparatus 101 and the external apparatus 301, which will be described later with reference to FIG. 3. For example, the communication unit 222 sends and receives data such as the audio data, the image data, the compressed audio data, and the compressed image data. The communication unit 222 also receives control signals related to shooting such as a shooting start command, a shooting end command, and drive commands for panning/tilting and zooming from the external apparatus 301. Based on the received control signals, the first control unit 223 controls shooting in the image pickup apparatus 101. The communication unit 222 also sends and receives information such as various parameters related to learning, which is processed by the learning processing unit 219, between the image pickup apparatus 101 and the external apparatus 301. Thus, the communication unit 222 has only to be a module capable of communication between the image pickup apparatus 101 and the external apparatus 301. Examples of the communication unit 222 include wireless communication modules such as an infrared communication module, a Bluetooth communication module, a wireless LAN communication module, a wireless USB, and a GPS receiver.

The subject detecting unit 225 reads out image data, which is output from the image processing unit 207, from the memory 215 and recognizes a subject such as a person or an object.

To recognize a person, the subject detecting unit 225 carries out a face detection process in which it detects the face or body of a subject. In the face detection process, a pattern for determining the face of a person is determined in advance, and an area that matches the pattern included in a shot image is detected as a face image of a person, and an identifier for distinguishing one person from the other persons is also issued.

At the same time, the subject detecting unit 225 also calculates the degree of reliability that indicates certainty as a face of a subject. Here, the degree of reliability is calculated from, for example, the size of a face area in an image and the degree of coincidence with a face pattern.

Likewise, the subject detecting unit 225 performs pattern matching in a face image. Thus, face information indicating whether a detected face is smiling, whether or not eyes are open, an orientation of the face, and so forth can also be detected.

It should be noted that the method for detecting a face image using the subject detecting unit 225 is not limited to pattern matching, but a known art such as a method using deep learning can be used.

Likewise, as for object recognition using the subject detecting unit 225, an object that matches a pattern registered in advance can be recognized.

It should be noted that the face detection process using the subject detecting unit 225 is not limited to the method described above.

For example, a method in which a histogram of hue, saturation, or the like in a shot image is used, and a characteristic subject is extracted may be adopted. In this case, for an image of a subject captured within the field of view in photography, an image in which a distribution derived from a histogram of hue, saturation, or the like is divided into a plurality of sectors, and images taken in the respective sectors are classified is carried out.

Moreover, for example, an image area of a subject may be recognized by creating a plurality of histograms, each of which has a different color component, for a shot image, dividing them into mountain-shaped distribution ranges, and classifying the shot image in areas belonging to combinations in the same sections.

Furthermore, by calculating evaluation values for respective image areas of recognized subjects, an image area of the subject with the highest evaluation value can be determined as a main subject area.

With the above described method, the subject detecting unit 225 obtains each subject information from shot image information.

The RFID receiving unit 226 (receiving unit) has at least three antennas that receive radio waves transmitted from an RFID tag 305 (FIG. 3) located outside the image pickup apparatus 101 and is capable of retrieving information transmitted from the RFID tag 305. The RFID receiving unit 226 is capable of detecting the position of the RFID tag 305 using the principle of trilateration or the like based on the strengths of radio waves received by the respective ones of the at least three antennas and differences in time at which they are received. It should be noted that a wireless tag other than the RFID tag 305 may be used as long as it can be attached to a subject and wirelessly transmit radio waves. For example, a portable BLE beacon may be used in position of the RFID tag 305.

<Arrangement in Relation to External Communication Equipment>

Figure 3:
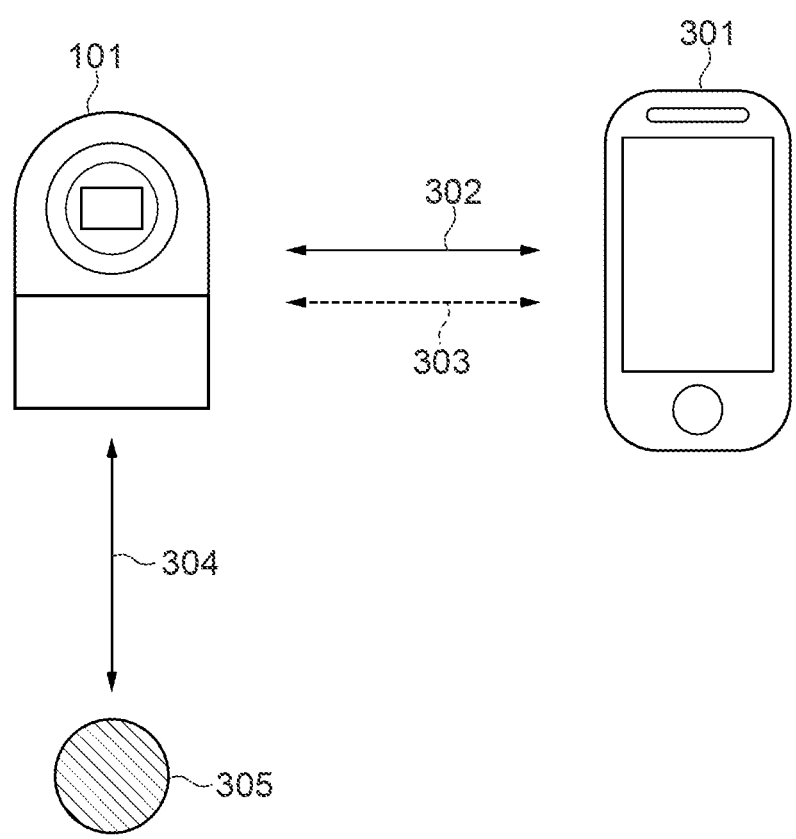
FIG. 3 is a view schematically showing an example of an arrangement of a wireless communication system that has the image pickup apparatus, an external apparatus, and an RFID tag.

FIG. 3 is a view schematically showing an example of an arrangement of a wireless communication system including the image pickup apparatus 101, the external apparatus 301, and the RFID tag 305.

A description will now be given of communication between the image pickup apparatus 101 and the external apparatus 301.

The image pickup apparatus 101 is a digital camera equipped with a shooting function as described with reference to FIG. 1 and FIG. 2.

The external apparatus 301 is a smart device including a Bluetooth communication module and a wireless LAN communication module.

The image pickup apparatus 101 and the external apparatus 301 are capable of performing communication using two communication methods i.e., communication methods 302 and 303.

With the communication method 302, communication is performed using a wireless LAN compliant with a series of IEEE 802.11 standards.

With the communication method 303, communication with a master-slave relationship comprised of a control station and a subordinate station is performed using Bluetooth Low Energy (hereafter referred to as "BLE").

It should be noted that the wireless LAN and BLE are examples of communication methods used for communication between the image pickup apparatus 101 and the external apparatus 301, and other communication methods may be used as long as communication can be performed between the image pickup apparatus 101 and the external apparatus 301 using two or more communication methods as communication methods 302 and 303. However, in the case where the communication method 302 is used, communication can be performed at higher speed than in the case where the communication method 303 is used. Moreover, in the case where communication method 303 is used, a smaller amount of power is consumed, or communication can be performed over a shorter distance than in the case where the communication method 302 is used.

Figure 4:
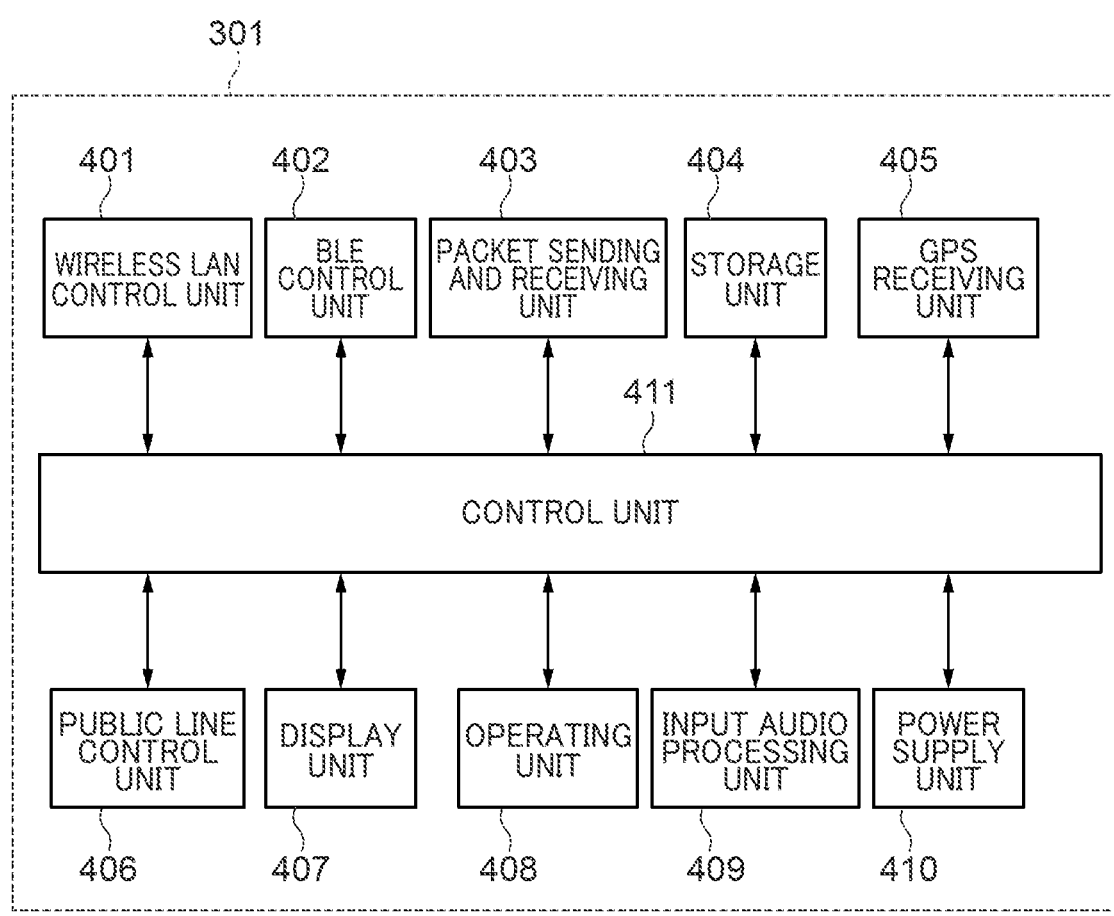
FIG. 4 is a diagram showing an arrangement of the external apparatus.

Referring to FIG. 4, a description will now be given of an arrangement of the external apparatus 301.

The external apparatus 301 has a wireless LAN control unit 401 for the wireless LAN, a BLE control unit 402 for BLE, and a public line control unit 406 for public wireless communication. The external apparatus 301 also has a packet sending and receiving unit 403.

The wireless LAN control unit 401 is a driver that executes RF control for a wireless LAN, a communication process, and various types of control for communication using a wireless LAN compliant with a series of IEEE 802.11 standards, and performs protocol processing on communication using a wireless LAN.

The BLE control unit 402 is a driver that executes RF control for BLE, a communication process, and various types of control for communication using BLE, and performs protocol processing on communication using BLE.

The public line control unit 406 is a driver that executes RF control for public wireless communication, a communication process, and various types of control for public wireless communication, and performs protocol processing on public wireless communication. The public wireless communication is, for example, compliant with the IMT (International Multimedia Telecommunications) standard, or the LTE (Long Term Evolution) standard, or the like.

The packet sending and receiving unit 403 carries out a process to perform at least one of transmission and reception of packets related to communication using a wireless LAN and BLE and public wireless communication. It should be noted that although in the description of the embodiment 1, it is assumed that the packet sending and receiving unit 403 performs at least one of transmission and reception of packets, another form of communication such as circuit switching other than packet switching may be used.

The external apparatus 301 also has a control unit 411, a storage unit 404, a GPS receiving unit 405, a display unit 407, an operating unit 408, an input audio processing unit 409, and a power supply unit 410.

The control unit 411 controls the overall external apparatus 301 by executing control programs stored in, for example, the storage unit 404.

The storage unit 404 stores, for example, control programs, which are executed by the control unit 411, and various types of information such as parameters required for communication. Various types of operations, which will be described later, are implemented by the control unit 411 executing the control programs stored in the storage unit 404.

The power supply unit 410 supplies power to the external apparatus 301.

The display unit 407 has an audio output function such as a speaker as well as a visually-recognizable information output function such as an LCD or LED, so as to notify the user of various types of information.

The operating unit 408 is, for example, a button that receives operations on the external apparatus 301 by the user. It should be noted that the display unit 407 and the operating unit 408 may be comprised of a common member such as a touchscreen.

The input audio processing unit 409 may be configured to obtain voice uttered by the user through, for example, a general-purpose microphone incorporated in the external apparatus 301 and carry out an audio recognition process to obtain a user's operating instruction from a result of recognition of the obtained voice.

A GPS (Global Positioning System) 405 receives a GPS signal sent from a satellite and analyzes the GPS signal to estimate a current position (longitude/latitude information) of the external apparatus 301. Alternatively, the current position of the external apparatus 301 can be estimated based on information about a wireless network around it using WPS (Wi-Fi Positioning System or the like. When the obtained current GPS positional information falls inside a positional range set in advance (inside a range of a predetermined radius), the image pickup apparatus 101 is notified of movement information through the BLE control unit 402, and the movement information is used as parameters for automatic shooting and automatic editing, which will be described later. When there is more than a predetermined amount of position change in the GPS positional information, the image pickup apparatus 101 is notified of movement information through the BLE control unit 402, and the movement information is used as parameters for automatic shooting and automatic editing, which will be described later.

As described above, the image pickup apparatus 101 and the external apparatus 301 exchange data through communication using the wireless LAN control unit 401 and the BLE control unit 402. For example, they send and receive audio data, image data, compressed audio data, and compressed image data. The external apparatus 301 also sends setting information relating to shooting to be performed by the image pickup apparatus 101. The external apparatus 301 also sends operating instructions for shooting or the like to be performed by the image pickup apparatus 101 as well as a predetermined position detection notification and a location change notification based on GPS position information. The external apparatus 301 also sends and receives learning data through dedicated applications within the external apparatus 301.

<Arrangement in Relation to RFID>

Referring to FIG. 3 again, a description will now be given of communication between the image pickup apparatus 101 and the RFID tag 305.

The RFID tag 305 has an antenna for sending and receiving radio waves, and an IC chip from and to which data can be read and written. In the RFID tag 305, the IC chip is connected to the antenna.

Information can be written to the IC chip of the RFID tag 305 in accordance with purposes of use.

The image pickup apparatus 101 and the RFID tag 305 are capable of communicating together through communication 304 such as a radio wave method called the UHF band or an electromagnetic induction method called the HF band. The RFID tag 305 is capable of sending various types of information written to the IC chip to the image pickup apparatus 101 through the communication 304.

The RFID tag 305 is also capable of sending information called RSSI (Received Signal Strength Indicator) indicating the strength of a radio wave sent from the RFID tag 305. The image pickup apparatus 101 is capable of calculating the distance to the RFID tag 305 based on the relationship between the RSSI sent from the RFID tag 305 and the strength of the radio wave that the image pickup apparatus 101 actually received from the RFID tag 305.

In the embodiment 1, when the RFID tag 305 is detected, a subject is made easily detectable by setting a threshold value for detecting the subject to a small value, and an automatic shooting process is carried out. A concrete description thereof will now be given.

Figure 5:
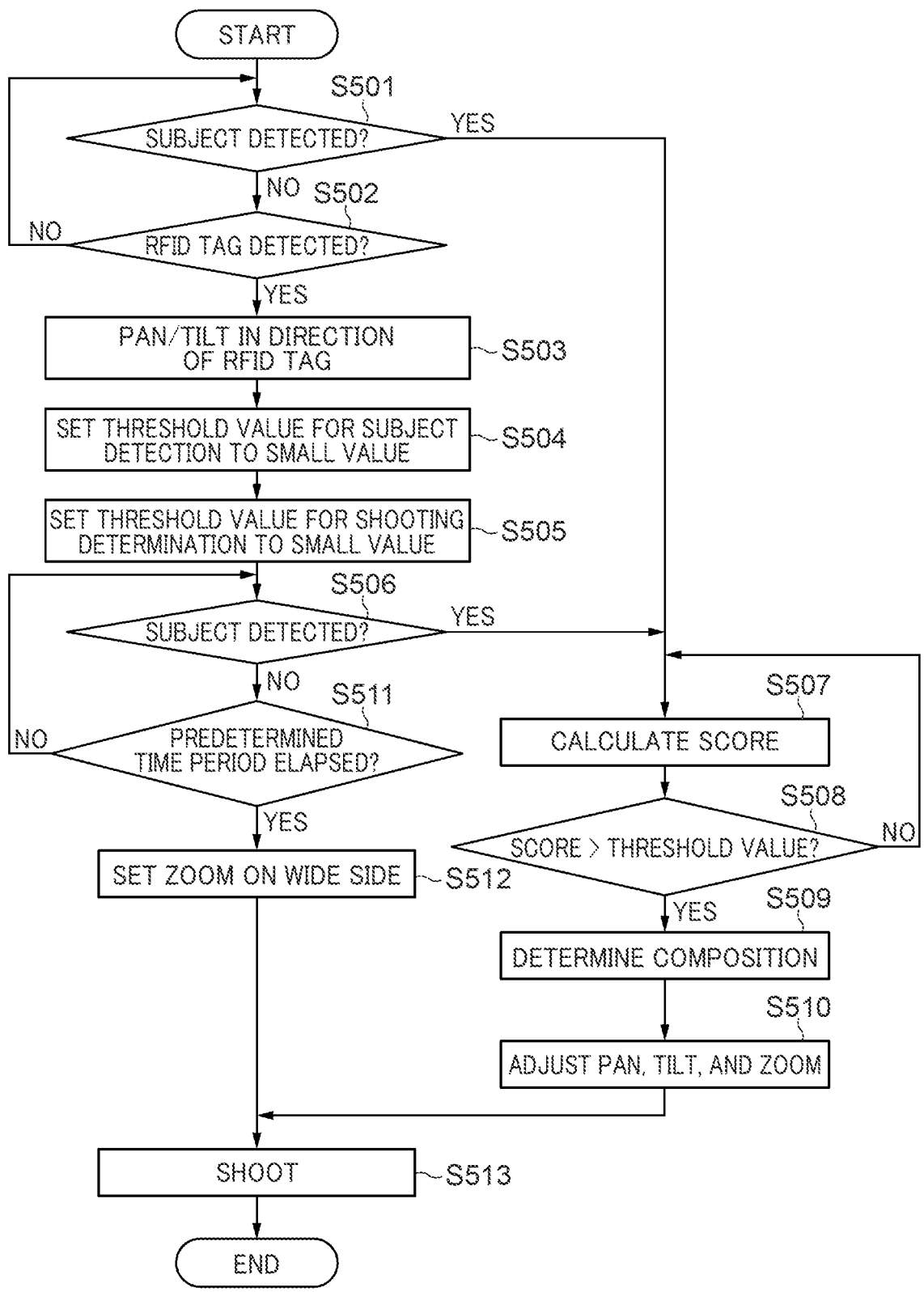
FIG. 5 is a flowchart of an automatic shooting process according to the embodiment 1.

FIG. 5 is a flowchart of the automatic shooting process according to the embodiment 1.

This automatic shooting process is implemented by the first control unit 223 executing a program stored in the nonvolatile memory 216.

First, in step S501, the subject detecting unit 225 is used to determine whether or not a subject has been detected. When it is determined that the subject has been detected (YES in the step S501), the process proceeds to step S507. On the other hand, when it is determined that the subject has not been detected (NO in the step S501), the process proceeds to step S502.

In the step S502, the RFID receiving unit 226 is used to determine whether or not a position of the RFID tag 305 held by the subject has been detected. When it is determined that the position of the RFID tag 305 has been detected (YES in the step S502), the process proceeds to step S503. On the other hand, when it is determined that the position of the RFID tag 305 has not been detected (NO in the step S502), the process returns to the step S501, in which the subject is detected again. It should be noted that in this case, the lens barrel rotating unit 205 may be instructed to rotate the lens barrel 102 in the pan direction or tilt direction through an angle set in advance so that the subject can be detected or even if the subject cannot be detected, the RFID tag 305 can be detected.

In the step S503, the lens barrel rotating unit 205 is instructed to change the orientation of the lens barrel 102 so that the optical axis of the image pickup unit 206 can face toward the detected RFID tag 305. After that, when it is detected that the optical axis of the image pickup unit 206 faces toward the detected RFID tag 305, the process proceeds to step S504.

In the step S504, a threshold value for detecting an area of a person or a face from the subject detected by the subject detecting unit 225 is set to a smaller value than its initial value (setting unit). This makes it easier to detect an area of a person or a face from the subject detected by the subject detecting unit 225. Here, the threshold value is, for example, a threshold value for the reliability of an area detected as a person or a face. The subject detecting unit 225 may carry out a pattern matching process in which it calculates the degree of coincidence between a detected area of the subject and a pattern. In this case, the threshold value to be used here may be a threshold value for the calculated degree of coincidence.

It should be noted that by setting the threshold value for detecting an area of a person or a face to a small value, the probability that an area that is not a person or a face is erroneously detected is increased. However, at the time of step S506, the optical axis of the image pickup unit 206 faces toward the RFID tag 305, and hence there is surely a person in the current field of view. Thus, it is unlikely that an area that is not a person or a face is erroneously recognized.

In step S505, a threshold value for shooting determination is set to a smaller value than its initial value. The threshold value for shooting determination is a threshold value for a score calculated in the step S507. Setting the threshold value for shooting determination to the small value facilitates performing automatic shooting.

In the step S506, the subject detecting unit 225 is used again to determine whether or not a subject has been detected. For this determination, the threshold value set to the small value in the step S504 is used. When it is determined that the subject has not been detected (NO in the step S506), the process proceeds to step S511. On the other hand, when it is determined that the subject has been detected (YES in the step S506), the process proceeds to the step S507.

In the step S507, a score of an image in the current field of view is calculated based on image information on the detected subject.

The score of the image is calculated based on indicators such as whether there is a person or not, whether the person is smiling or not, whether eyes are open or not, and the orientation of a face, and as the score increases, the image is calculated as being a better image. It should be noted that these indicators are detected by the subject detecting unit 225.

Then, in step S508, the score calculated in the step S507 is compared with the threshold value for shooting determination (shooting determination unit). When it is determined that the score is greater than the threshold value for shooting determination (YES in the step S508), the process proceeds to step S509 (NO in the step S508), and when it is determined that the score is not greater than the threshold value for shooting determination (NO in the step S508), the process returns to the step S507. As a result, it is possible to stand by for shooting until the facial expression of the detected subject and the orientation of the face become desirable.

In the step S509, a composition for shooting is determined. The composition determined here is a composition selected based on a history of compositions used for shooting in the past. Examples of the composition is a composition in which a subject lies in the center, a composition in which there is a space on the right or left of a subject, a composition in which a subject is shot in a large size, and a composition in which the entire scene is widely shot. The composition may be a combination of these compositions. Thus, variations of shooting can be increased even when automatic shooting is performed using the image pickup apparatus 101 placed at the same location.

Then, in step S510, the lens barrel rotating unit 205 and the zoom drive control unit 202 are instructed to control panning/tilting and zooming so that the composition determined in the step S509 can be obtained. When as a result of this control, the movement of the lens barrel 102 in the pan/tilt direction and the actuation of the zoom unit 201 are finished, and the composition determined in the step S509 is obtained, the process proceeds to step S513.

In the step S511, a time period that has elapsed without the subject being detected since the optical axis of the image pickup unit 206 faced toward the RFID tag 305 in the step S503 is calculated, and whether or not a time period set in advance (predetermined time period) has elapsed is determined based on the calculated time period. When it is determined that the predetermined time period has not elapsed (NO in the step S511), the process returns to the step S506. On the other hand, when it is determined that predetermined time period has elapsed (YES in the step S511), the process proceeds to step S512.

In the step S512, the zoom drive control unit 202 is instructed to adjust the zoom to a wider side than the present setting, and then the process proceeds to the step S513. As a result, an area around the RFID tag 305 can be widely shot. Thus, even when the subject could not be detected in the step S501 or S506, the subject can be prevented from being not in the picture, and the face of the subject can be prevented from sticking out of the field of view at the time of shooting in step S513.

In the step S513, shooting is performed in a state in which the zoom was set in the step (the step S510 or the step S512) just before the step S513, and then the process in FIG. 5 is ended. It should be noted that shooting in the step S513 may be performed a plurality of times while the zoom is varied. In this case, it is preferable to set the zoom in the step just before the step S513 such that the frequency of shooting is increased on a wide side to make it easier for the subject to fit in the shot image.

As described above, according to the embodiment 1, even when it is difficult to detect the subject using the subject detecting unit 225, an area around which the RFID tag 305 was detected by the RFID receiving unit 226 is shot at a wide setting. As a result, the subject can be reliably shot. Moreover, shooting suited to the facial expression of the subject and the composition can be performed, and hence convenience for the user can be improved.

Embodiment 2

In the embodiment 2, even when the subject cannot be detected using the subject detecting unit 225, the composition can be properly adjusted according to the location to which the RFID tag 305 is attached.

It should be noted that in a hardware arrangement and a software arrangement (step numbers) in the embodiment 2, the same components as those in the embodiment 1 are designated by the same reference symbols, detailed description of which, therefore, is omitted.

FIG. 6 is a flowchart of an automatic shooting process according to the embodiment 2.

This automatic shooting process is implemented by the first control unit 223 executing a program stored in the nonvolatile memory 216.

First, a process in which whether or not the RFID tag 305 has been detected and whether or not to perform shooting are determined is carried out in the step S601, and then the process proceeds to step S602.

The process in the step S601 is the same as the process in the steps S501 to S506 in FIG. 5. However, when the subjected has been detected (YES in the step S501 or YES in the step S506), the process in the step S507 and the subsequent steps is carried out as with the process in FIG. 5.

Next, in step S602, a position to which the RFID tag 305 is attached is obtained (attached position obtaining unit).

Examples of the position to which the RFID tag 305 is attached include a hat, collar, belt, and shoe.

The position to which the RFID tag 305 is attached may be stored in the RFID tag 305 itself so that the position is obtained in the step S602 by receiving it from the RFID tag 305 by the RFID receiving unit 226. The position to which the RFID tag 305 is attached may also be obtained by storing it in the nonvolatile memory 216 in advance as a setting made by the user using the external apparatus 301 or an operating member, not shown, and reading it from the nonvolatile memory 216 in the step S602.

Then, in step S603, it is determined whether or not the position to which the RFID tag 305 is attached obtained in the step S602 is the collar. When it is determined that the position to which the RFID tag 305 is attached is not the collar (NO in the step S603), the process proceeds to step S605. On the other hand, when it is determined that the position to which the RFID tag 305 is attached is the collar (YES in the step S603), the process proceeds to step S604.

In the step S604, the composition is set such that the RFID tag 305 is positioned slightly above the center in a field of view 701 (FIG. 7A), and then the process proceeds to step S609.

Figure 7A:
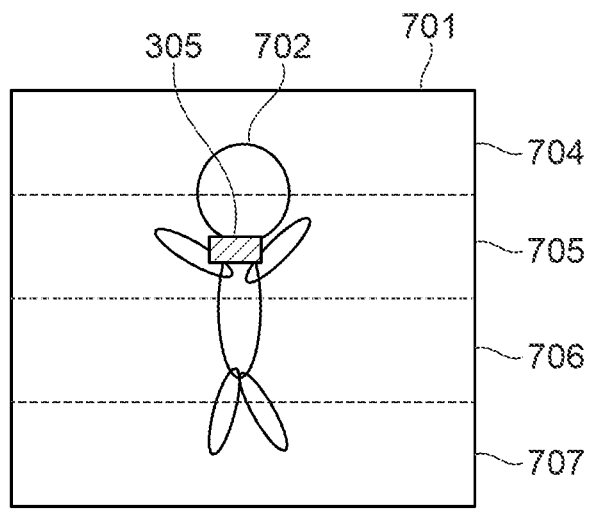
FIG. 7A is a view schematically showing a case where an RFID tag attached to a collar of a subject is located slightly above the center in the field of view.

FIG. 7A is a view schematically showing a case where the RFID tag 305 attached to the collar of a subject 702 is positioned slightly above the center in the field of view 701.

In the field of view 701 illustrated in FIG. 7A, the RFID tag 305 is attached to the collar of the subject 702. In this case, by positioning the RFID tag 305 slightly above the center in the field of view 701 (i.e. at an area 705), the whole body of the subject 702 is captured without the face of the subject 702 sticking out of the field of view 701.

In the following description, areas obtained by vertically dividing the field of view 701 into four will be referred to as an area 704, the area 705, an area 706, and an area 707.

Referring to FIG. 6 again, in step S605, it is determined whether or not the position to which the RFID tag 305 is attached obtained in the step S602 is the belt. When it is determined that the position to which the RFID tag 305 is attached is not the belt (NO in the step S605), the process proceeds to step S607. On the other hand, when it is determined that the position to which the RFID tag 305 is attached is the belt (YES in the step S605), the process proceeds to step S606.

In the step S606, the composition is set such that the RFID tag 305 is positioned slightly below the center in the field of view 701 (FIG. 7B), and then the process proceeds to step S609.

Figure 7B:
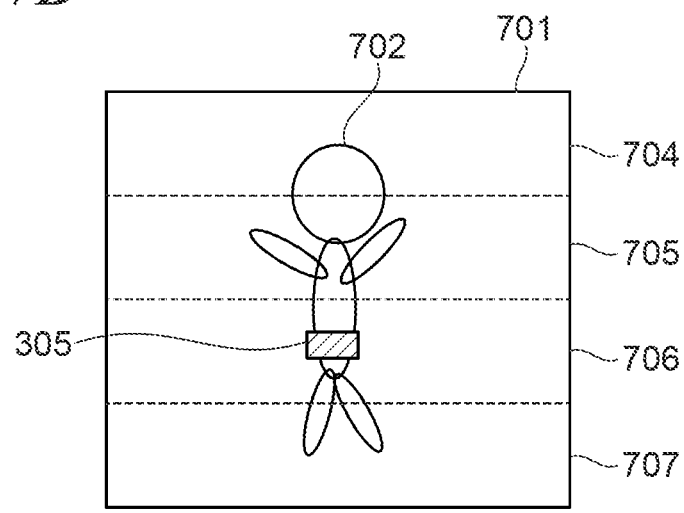
FIG. 7B is a view schematically showing a case where the RFID tag attached to a belt of the subject is located slightly below the center in the field of view.

FIG. 7B is a view schematically showing a case where the RFID tag 305 attached to the belt of the subject 702 is located slightly below the center in the field of view 701.

In the field of view 701 illustrated in FIG. 7B, the RFID tag 305 is attached to the belt of the subject 702. In this case, by positioning the RFID tag 305 slightly below the center in the field of view 701 (i.e. at the area 706), the whole body of the subject 702 is captured without the face of the subject 702 sticking out of the field of view 701.

Referring to FIG. 6 again, in step S607, it is determined whether or not the position to which the RFID tag 305 is attached obtained in the step S602 is the shoe. When it is determined that the position to which the RFID tag 305 is attached is not the shoe (NO in the step S607), the process proceeds to step S513. On the other hand, when it is determined that the position to which the RFID tag 305 is attached is the shoe (YES in the step S607), the process proceeds to step S608.

In the step S608, the composition is set such that the RFID tag 305 is positioned in a lower part of the field of view 701 (FIG. 7C), and then the process proceeds to the step S609.

Figure 7C:
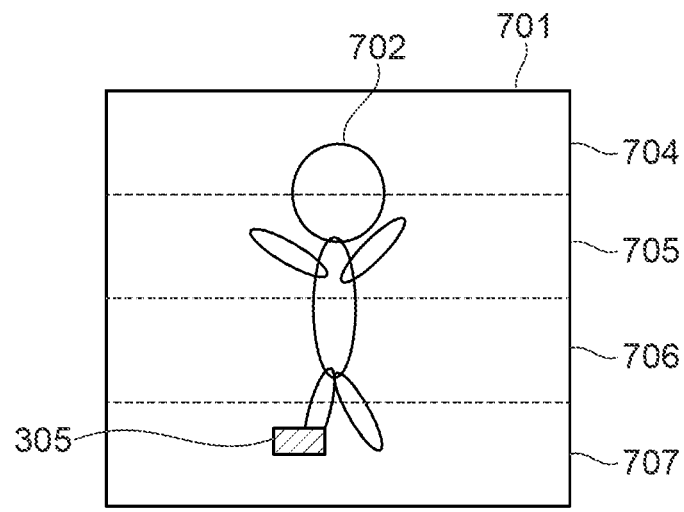
FIG. 7C is a view schematically showing a case where the RFID tag attached to a shoe of the subject is located in a lower part in the field of view.

FIG. 7C is a view schematically showing a case where the RFID tag 305 attached to the shoe of the subject 702 is located in the lower part in the field of view 701.

In the field of view 701 illustrated in FIG. 7C, the RFID tag 305 is attached to the shoe of the subject 702. In this case, by positioning the RFID tag 305 in the lower part of the field of view 701 (i.e. at the area 707), the whole body of the subject 702 is captured without the face of the subject 702 sticking out of the field of view 701.

Referring to FIG. 6 again, next, in the step S609, an instruction is issued to the lens barrel rotating unit 205 so that the composition set in the step (that is, one of the steps S604, S606, and S608) immediately before the step S609 can be obtained. After that, when the lens barrel 102 has finished rotating, and it is detected that the set composition has been obtained, the process proceeds to the step S513.

In the step S513, shooting is performed, and then the process in FIG. 6 is ended.

As described above, according to the embodiment 2, even when it is impossible to detect the subject using the subject detecting unit 225, the composition can be properly set based on the position, obtained in the step S602, to which the RFID tag 305 is attached, and hence convenience for the user can be improved.

Embodiment 3

When automatic shooting is performed using the RFID tag 305, there may be cases where a plurality of RFID tags 305 are detected.

Examples of the cases include a case where brothers hold the respective RFID tags 305, and a case where the RFID tags 305 are attached to some toys.

A description will now be given of an example in which a plurality of RFID tags 305 are detected by the RFID receiving unit 226 in the embodiment 3.

It should be noted that the same components in a hardware arrangement and a software arrangement (step numbers) in the embodiment 3 as those in the embodiment 1 are designated by the same reference symbols, detailed description of which, therefore, is omitted.

Figure 8:
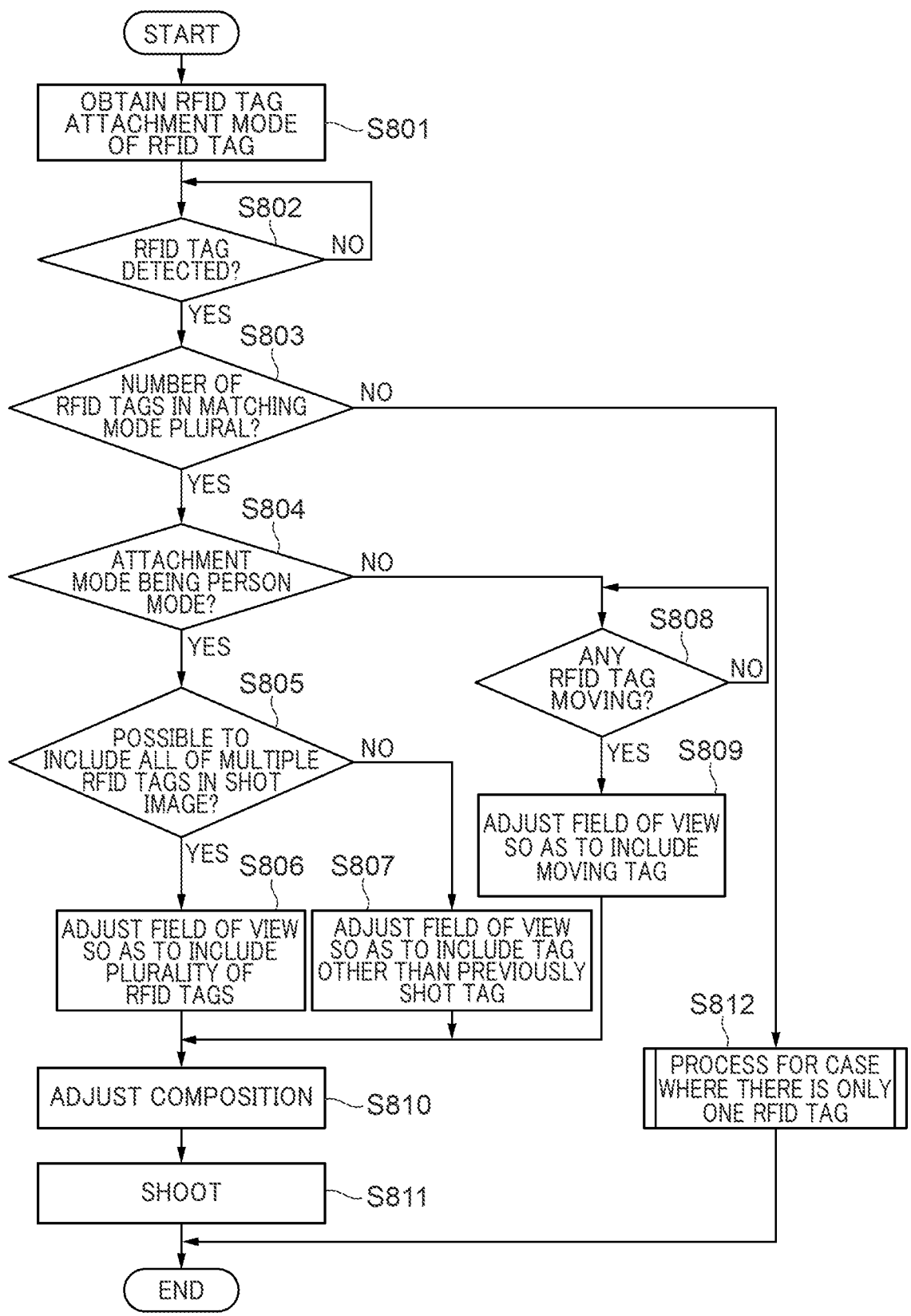
FIG. 8 is a flowchart of an automatic shooting process according to an embodiment 3.

FIG. 8 is a flowchart of an automatic shooting process according to the embodiment 3.

This automatic shooting process is implemented by the first control unit 223 executing a program stored in the nonvolatile memory 216.

First, in step S801, an attachment mode (usage mode) of the RFID tag 305 is obtained. The attachment mode is information indicating where the RFID tag 305 is attached, and includes a person mode in which the RFID tag 305 is attached to a person, and a toy mode in which the RFID tags 305 are attached to a toy. Specifically, the attachment mode of the RFID tag 305 can be obtained from the external apparatus 301. The attachment mode of the RFID tag 305 may be obtained by storing it in the nonvolatile memory 216 (mode storage unit) in advance as a setting made by the user using an operating member, not shown, and reading it from the nonvolatile memory 216 in the step S801. It should be noted that in each RFID tag 305, the attachment mode thereof is stored in advance.

Next, in step S802, the RFID receiving unit 226 is used to determine whether or not at least one of the RFID tags 305 has been detected. When it is determined that at least one of the RFID tags 305 has been detected (YES in the step S802), the process proceeds to step S803. On the other hand, when it is determined that no RFID tag 305 has been detected (NO in the step S802), the determination in the step S802 is made again.

In the step S803, from the detected RFID tags 305, the attachment mode of each is obtained, and it is determined whether or not a plurality of RFID tags 305 whose attachment mode corresponds to the attachment mode obtained in the step S801 has been detected. When a plurality of RFID tags 305 whose attachment mode corresponds to the attachment mode obtained in the step S801 has been detected (YES in the step S803), the process proceeds to step S804, and when not (NO in the step S803), the process proceeds to step S812.

In the step S812, a process for the case where one RFID tag 305 has been detected is carried out, and then the process in FIG. 8 is ended. It should be noted that the process in the step S812 is the same as the process in the step S503 and the subsequent steps in FIG. 5.

In the step S804, it is determined whether or not the attachment mode obtained in the step S801 is the person mode. When it is determined that the attachment mode is the person mode (YES in the step S804), the process proceeds to step S805. On the other hand, when it is determined that the attachment mode is a mode other than the person mode (NO in the step S804), the process proceeds to step S808. It should be noted that in the embodiment 3, there are the two attachment modes consisting of the person mode and the toy mode, and hence when in the step S804, the attachment mode is a mode other than the person mode, it is determined that the attachment mode is the toy mode.

In the step S805, based on the positional relationship among the detected RFID tags 305 and the present field of view, it is determined whether or not all of the detected RFID tags 305 can be included in the field of view by adjusting the field of view (fit in the field of view). When it is determined that all of the detected RFID tags 305 can be included in the field of view (YES in the step S805), the process proceeds to step S806, and when it is determined that all of the detected RFID tags 305 cannot be included in the field of view (NO in the step S805), the process proceeds to step S807.

In the step S806, the field of view is adjusted such that all of the detected RFID tags 305 are included in the field of view, and the process proceeds to step S810 (field-of-view setting unit).

In the step S807, the field of view is adjusted such that all of tags other than the tags shot last time among the detected RFID tags 305 are included in the field of view, and the process proceeds to the step S810 (field-of-view setting unit). The tags other than the tags shot last time among the detected RFID tags 305 are chosen by storing information on the RFID tags 305 whenever they are shot and comparing the information with information on the currently detected RFID tag(s) 305.

In the step S808, it is determined whether or not there is any moving RFID tag among the detected plurality of RFID tags 305. Specifically, positions of the RFID tags 305 detected at the time of automatic shooting performed several times in the past are stored in the memory 215, and when there is a moving tag whose detected position has shifted from the stored position among the detected RFID tags 305, it is determined that this tag is moving.

When it is determined that there is any moving tag (YES in the step S808), the process proceeds to step S809. When it is determined that there is no moving tag (NO in the step S808), the determination in the step S808 is made again.

In the step S809, a toy to which the moving tag is attached is regarded as one that is being currently used, and the field of view is adjusted such that the tag fits the field of view (field-of-view setting unit), and the process proceeds to step S810.

In the step S810, an instruction is issued to the lens barrel rotating unit 205 so that the field of view set in the step (that is, one of the steps S806, S807, and S809) immediately before the step S810 can be obtained. After that, when the lens barrel 102 has finished rotating, and it is detected that the set composition has been obtained, the process proceeds to step S811.

In the step S811, shooting is performed, and then the process in FIG. 8 is ended.

It should be noted that the process in FIG. 8 may include a process carried out in the case where the attachment mode is an animal mode in which the RFID tag 305 is attached to an animal. Specifically, when the attachment mode is the animal mode, shooting is performed when the RFID tag 305 has come close to the image pickup apparatus 101. Thus, the animal to which the RFID tag 305 is attached can be shot from the front.

As described above, according to the embodiment 3, when there is a plurality of RFID tags 305, the field of view is switched according to the attachment modes and positions of the respective RFID tags 305. As a result, the composition can be appropriately set, and hence convenience for the user can be improved.

Embodiment 4

There may be cases where a subject with no RFID tag 305 is found near the RFID tag 305 such as a case where a child is holding the RFID tag 305, and parents of the child is close to the child. Thus, a description will now be given of an embodiment 4 in which a subject who with no RFID tag 305 attached is found near the RFID tag 305.

It should be noted that in a hardware arrangement and a software arrangement (step numbers) in the embodiment 4, the same components as those in the embodiment 1 are designated by the same reference symbols, detailed description of which, therefore, is omitted.

Figure 9:
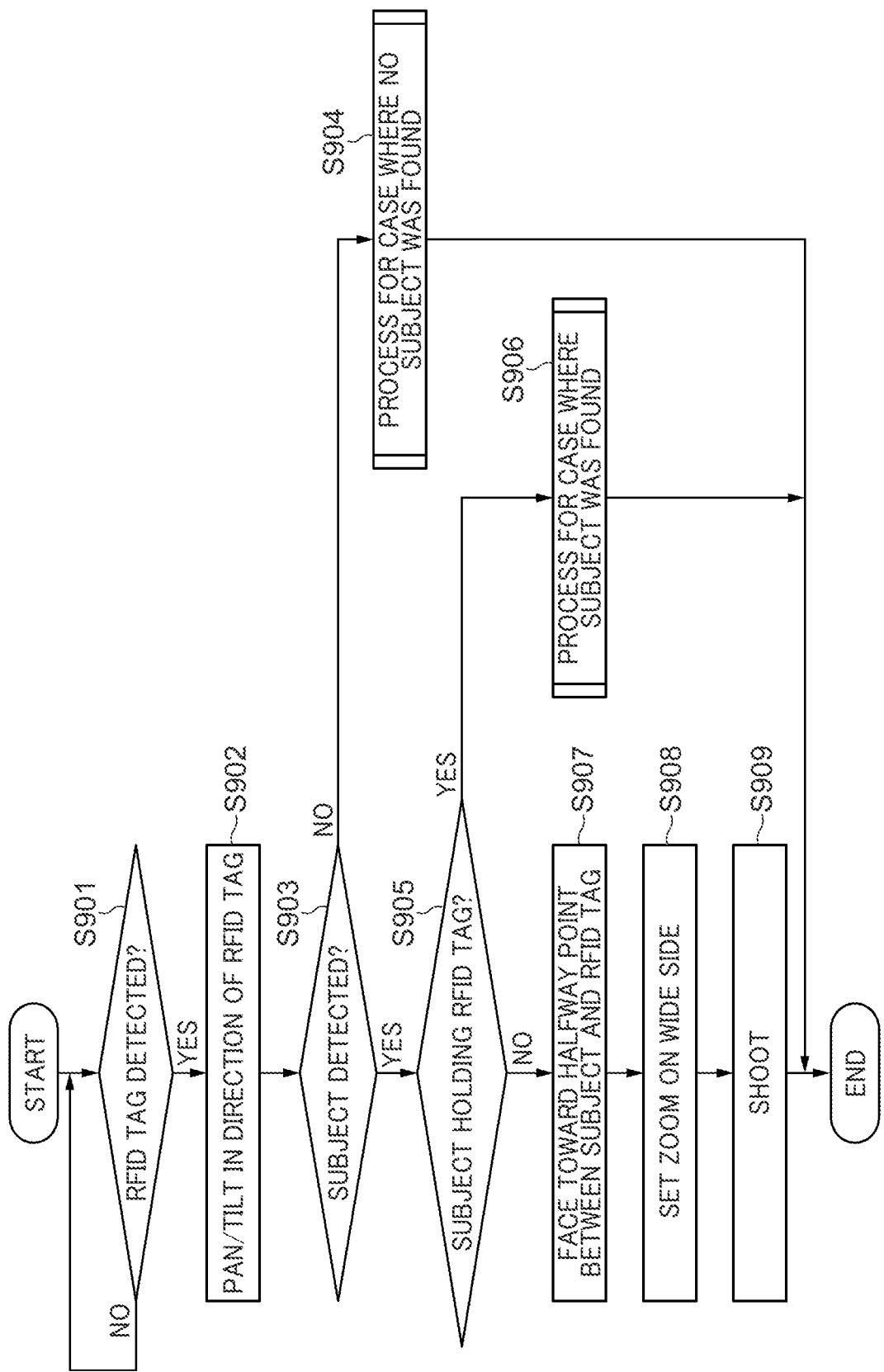
FIG. 9 is a flowchart of an automatic shooting process according to an embodiment 4.

FIG. 9 is a flowchart of an automatic shooting process according to the embodiment 4.

This automatic shooting process is implemented by the first control unit 223 executing a program stored in the nonvolatile memory 216.

First, in step S901, the RFID receiving unit 226 is used to determine whether or not the RFID tag 305 has been detected. When it is determined that the RFID tag 305 has been detected (YES in the step S901), the process proceeds to step S902. On the other hand, when it is determined that the RFID tag 305 has not been detected (NO in the step S901), the determination in the step S901 is made again.

In the step S902, the lens barrel rotating unit 205 is instructed to move the lens barrel 102 such that the lens barrel 102 faces toward the detected RFID tag 305. After that, when the lens barrel 102 faces toward the detected RFID tag 305, the process proceeds to step S903.

In the step S903, the subject detecting unit 225 is used to determine whether or not a subject has been detected. When it is determined that the subject has been detected (YES in the step S903), the process proceeds to step S905, and when it is determined that no subject has been detected (NO in the step S903), the process proceeds to step S904.

In the step S904, a process for the case where no subject was found is carried out. The process for the case where no subject was found is the same as the process in the step S504 and the subsequent steps in FIG. 5, and hence description thereof is omitted here. After the process in the step S904 is completed, the process in FIG. 9 is ended.

In the step S905, it is determined whether or not the detected subject is holding the RFID tag 305. Specifically, a position of the detected subject and the detected position of the RFID tag 305 are compared with each other, and when the distance between them in the horizontal direction is smaller than a threshold value, it is determined that the detected subject is holding the RFID tag 305. On the other hand, when the distance between them in the horizontal direction is equal to or greater than the threshold value, it is determined that the detected subject is not holding the RFID tag 305 (subject with no tag).

When it is determined that the detected subject is holding the RFID tag 305 (YES in the step S905), the process proceeds to step S906, and when it is determined that the detected subject is no holding the RFID tag 305 (NO in the step S905), the process proceeds to step S907.

In the step S906, a process for the case where a subject holding the RFID tag 305 was found is carried out. The process for the case where a subject holding the RFID tag 305 was found is the same as the process in the step S507 and the subsequent steps in FIG. 5, and hence description thereof is omitted here. After the process in the step S906 is completed, the process in FIG. 9 is ended.

In the step S907, the lens barrel rotating unit 205 is instructed to rotate the lens barrel 102 so that the optical axis of the image pickup device can face toward a halfway point between the detected subject and the RFID tag 305, and when the rotation of the lens barrel 102 is completed, the process proceeds to step S908.

Figure 10:
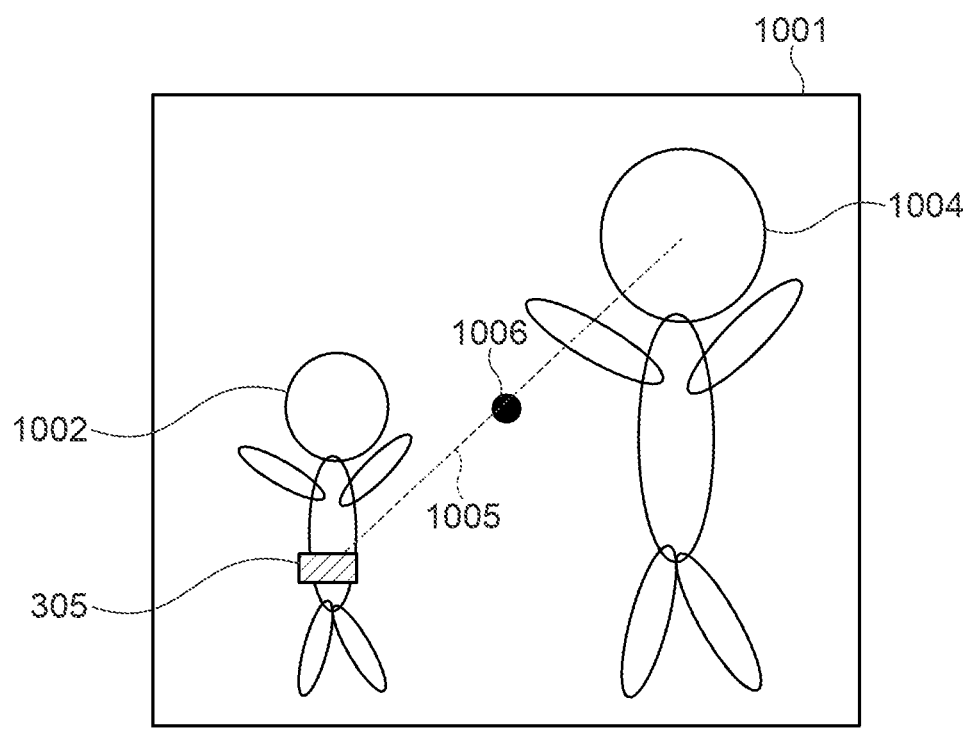
FIG. 10 is a view showing a field of view during a process after rotation in step S907 in FIG. 9 is completed.

FIG. 10 is a view showing a field of view 1001 during a process after the rotation of the lens barrel 102 in the step S907 in FIG. 9 is completed.

A subject 1002 with the RFID tag 305 attached to a belt and a subject 1004 who does not hold the RFID tag 305 are in the field of view 1001 illustrated in FIG. 10.

Assuming that the position of the subject 1004 is the center of his/her face and the position of the subject 1002 is the position of the RFID tag 305, a halfway point between the positions of the subjects 1002 and 1004 is a central point 1006 of a line 1005 that connects the two positions together.

By causing the lens barrel 102 to face toward the central point 1006, both the subject 1002 with the RFID tag 305 and the subject 1004 with no RFID tag 305 can be captured within the field of view 1001.

Referring to FIG. 9 again, in the step S908, the zoom drive control unit 202 is instructed to adjust the zoom to the wide side until both the subject 1002 with the RFID tag 305 and the subject 1004 with no RFID tag 305 fit in the field of view 1001, and then the process proceeds to step S909.

In the step S909, shooting is performed, and then the process in FIG. 9 is ended.

As described above, according to the embodiment 4, even when the subject 1004 with no RFID tag 305 is close to the RFID tag 305 which the subject 1002 is holding, both of the subjects 1002 and 1004 can fit in the field of view 1001. As a result, convenience for the user is improved.

Although the present invention has been described by way of the preferred embodiments, the present invention should not be limited to the embodiments described above, but various modifications and alterations can be made without departing from the spirit of the prevent invention.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-174915, filed on Oct. 26, 2021, which is hereby incorporated by reference wherein in its entirety.

What is claimed is:

1. An image pickup apparatus comprising:
an image pickup unit;
a changing unit that changes an orientation of an optical axis of the image pickup unit;
a receiving unit that receives a radio wave transmitted from an external wireless tag to detect a position of the wireless tag;
a subject detecting unit that detects a subject from image data output from the image pickup unit;
at least one processor; and
a memory coupled to the at least one processor, the memory having instructions that, when executed by the processor, perform operations as:
a shooting determination unit that, based on the image data, determines whether or not to perform shooting using the image pickup unit when the subject is detected; and
a setting unit that, when the optical axis of the image pickup unit faces toward the wireless tag, sets a threshold value for detecting the subject using the subject detecting unit to a smaller value than an initial value thereof.

2. The image pickup apparatus according to claim 1, wherein the changing unit comprises a rotating unit that rotates the image pickup unit in at least one of a horizontal direction and a vertical direction.

3. The image pickup apparatus according to claim 1, wherein the changing unit adjusts an orientation of the optical axis of the image pickup unit such that the optical axis of the image pickup unit faces toward the wireless tag detected by the receiving unit.

4. The image pickup apparatus according to claim 1, wherein, in a case where the optical axis of the image pickup unit faces toward the wireless tag detected by the receiving unit, the shooting determination unit sets the threshold value for shooting determination to a smaller value than an initial value thereof.

5. The image pickup apparatus according to claim 4, wherein the shooting determination unit calculates a time period that has elapsed with no subject being detected by the subject detecting unit since the optical axis of the image pickup unit faced toward the wireless tag detected by the receiving unit, and when the calculated time period is equal to or longer than a timer period set in advance, the shooting determination unit determines that shooting is to be performed using the image pickup unit.

6. The image pickup apparatus according to claim 5, further comprising a zoom control unit that controls zoom of the image pickup unit,
wherein in a case where the shooting determination unit determines that the calculated time period is equal to or longer than the timer period set in advance, and shooting is to be performed using the image pickup unit, the zoom control unit adjusts the zoom to a wider side than a current setting.

7. The image pickup apparatus according to claim 1, further comprising an attachment position obtaining unit that obtains an attachment position at which the wireless tag is attached to the subject,
wherein according to the attachment position obtained by the attachment position obtaining unit, the changing unit adjusts the optical axis of the image pickup unit.

8. The image pickup apparatus according to claim 1, further comprising a field-of-view setting unit that sets a field of view of the image pickup unit, a mode storage unit that stores a usage mode of the wireless tag, and a mode obtaining unit that obtain the usage mode of the wireless tag,
wherein in a case where there is a plurality of wireless tags, each of which is identical to the wireless tag, the field-of-view setting unit changes the field of view according to the usage mode stored in the mode storage unit, the usage mode obtained by the mode obtaining unit with respect to each of the plurality of wireless tags, and the position detected by the receiving unit with respect to each of the plurality of wireless tags.

9. The image pickup apparatus according to claim 8, wherein in a case where the usage mode is a person mode in which the wireless tag is attached to a person, and wireless tags, which mode obtained by the mode obtaining unit is the person mode, are detected among the plurality of wireless tags, the field-of-view setting unit adjusts the field of view of the image pickup unit such that the detected wireless tags fit in a field of view of the image pickup unit.

10. The image pickup apparatus according to claim 8, wherein in a case where the usage mode is a mode other than the person mode, the field-of-view setting unit adjusts the field of view of the image pickup unit such that the wireless tag whose position has been detected by the receiving unit among the plurality of wireless tags and which is moving fits in an image shot by the image pickup unit.

11. The image pickup apparatus according to claim 8, wherein in a case where the usage mode is an animal mode in which the wireless tag is attached to an animal, the shooting determination unit determines that shooting is to be performed using the image pickup unit when the receiving unit detects that the position of the wireless tag has come close to the image pickup apparatus.

12. The image pickup apparatus according to claim 1, wherein in a case where the subject detecting unit has detected a subject who is not holding the wireless tag, the changing unit adjusts the orientation of the optical axis of the image pickup unit such that both the subject who is not holding the wireless tag and the wireless tag whose position has been detected by the receiving unit fit in the field of view of the image pickup unit.

13. A control method for an image pickup apparatus that has an image pickup unit, a changing unit that changes an orientation of an optical axis of the image pickup unit, a receiving unit that receives a radio wave transmitted from an external wireless tag to detect a position of the wireless tag, and a subject detecting unit that detects a subject from image data output from the image pickup unit, comprising
determining, based on the image data, whether or not to perform shooting using the image pickup unit when the subject is detected; and
setting, when the optical axis of the image pickup unit faces toward the wireless tag, a threshold value for detecting the subject using the subject detecting unit to a smaller value than an initial value thereof.

14. A non-transitory computer-readable storage medium storing a program for causing a computer to execute a control method for an image pickup apparatus having an image pickup unit, a changing unit that changes an orientation of an optical axis of the image pickup unit, a receiving unit that receives a radio wave transmitted from an external wireless tag to detect a position of the wireless tag, and a subject detecting unit that detects a subject from image data output from the image pickup unit, the control method comprising
determining, based on the image data, whether or not to perform shooting using the image pickup unit when the subject is detected; and
setting, when the optical axis of the image pickup unit faces toward the wireless tag, a threshold value for detecting the subject using the subject detecting unit to a smaller value than an initial value thereof.

\* \* \* \* \*